March 31, 1964 M. VAN RENSSEN 3,127,186
FRICTION DEVICE AND METHOD
Filed June 28, 1961
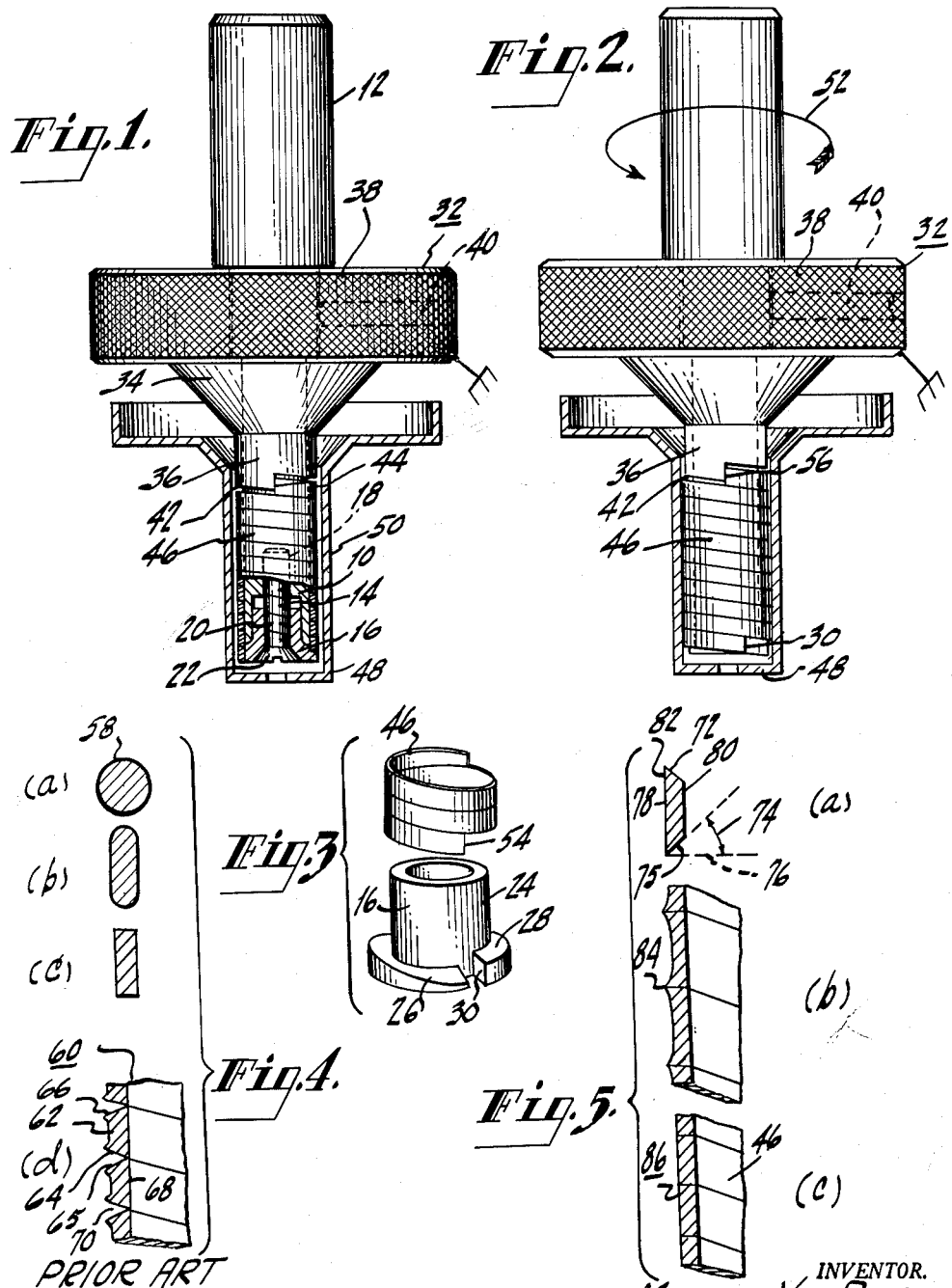
INVENTOR.
MARINUS VAN RENSSEN
BY
L. A. Larsen
ATTORNEY

United States Patent Office 3,127,186
Patented Mar. 31, 1964

3,127,186
FRICTION DEVICE AND METHOD
Marinus Van Reussen, Lancaster, Pa., assignor to Radio Corporation of America, a corporation of Delaware
Filed June 28, 1961, Ser. No. 120,354
5 Claims. (Cl. 279—2)

My invention relates to a friction device, and particularly concerns an expandable mandrel for frictionally engaging another element, or fragile tubular work piece, against displacement during a processing of the same, and to a method of making a part of the device.

One area in which the invention finds utility is in the machining of tubular grid blanks prior to the provision of apertures therein. One type of grid blank comprises an integral structure including a tubular portion and a flange portion disposed at one end of the tubular portion. To condition the tubular portion for providing apertures therein and for service as the active portion of the completed grid, it is necessary to reduce the thickness of the tubular portion. This reduction in thickness is effected by a machining procedure including subjecting the tubular portion to a plurality of relatively small area passes by a machining tool.

Since the tubular portion of the grid blank referred to, becomes increasingly thin during the machining operation and since relatively small area engagements occur between the machining tool and blank, it is necessary that all inner surface portions of the blank be adequately and uniformly supported to avoid deformation by the limited area pressure thereon by the machining tool.

Accordingly, an important object of the invention is to provide an improved friction device adapted to form a friction coupling with another member which may be a work piece requiring stability of position during a processing operation.

A further object of my invention is to provide a support for a tubular portion of a grid blank during a machining operation thereon, that uniformly engages all parts of the inner surface of the tubular blank portion with substantially equal force to provide uniform opposition to the pressure of the machining tool during its traverse of the blank.

Another object is to provide a support for a tubular blank, in the form of a mandrel having a substantially continuous cylindrical surface adapted to be contracted for a threading of the blank thereon and to be uniformly radially expanded for frictionally retaining the blank thereon during a machining operation.

A further object is to provide a radially expandable cylindrical mandrel having a surface defined by a helical spring structure adapted to be radially expanded by applying torques in one group of opposite directions to the end portions of the spring, to thereby cause the spring to frictionally engage the inner surface of a tubular work piece.

Another object is to provide a structure comprising a helical spring wherein the inner and outer surfaces of the structure are relatively smooth and the meeting edges of adjacent turns of the spring are planar and in butting engagement throughout the thickness of the spring stock.

A further object is to provide a novel method of fabricating a helix having turns in such contact engagement as to provide a substantially continuous outer cylindrical surface.

In one embodiment of the invention a friction device is provided comprising a helical spring and a structure associated therewith for supporting the spring and for applying a torque thereto in a direction to expand the spring radially. A tubular work piece placed over the spring in its contracted condition will be frictionally engaged by the spring when the latter is radially expanded. The device, accordingly, is adapted to hold a tubular member or work piece in mutually fixed relation therewith for any purpose including restraining the work piece from displacement during a machining of its outer surface.

A feature of the invention concerns the helical spring referred to. It is known that when spring stock is worked to the shape of a helical coil, strains are developed in the material of the spring. The predominant ones of such strains find release in surface deformations of the spring material. Such deformations result in irregularities in both the inner and outer surfaces of the resultant coil structure. Where the spring is used to engage the inner surface of a critically shaped and fragile work piece, such as a grid blank for an electron tube, such irregularities will tend to deform the work piece. Irregularities on the inner surface of the helical spring structure adversely affect a desired smooth coaction between such inner surface and the structure associated with the spring. According to this feature, there is provided a novel method of making a wire helix whose outer surface defines substantially a continuous cylindrical surface. The method involves preforming the wire prior to coiling, to provide a cross-section thereof having a shape for compensating for translations of the material of the wire in response to stresses applied thereto during the coiling operation.

Further objects and features of the invention will become apparent from a more detailed consideration of an embodiment thereof taken in connection with the accompanying drawing, wherein:

FIG. 1 is an elevation, partly in section, of a friction device embodying the invention, as well as a member in the form of a work piece, loosely engaged by the device;

FIG. 2 is a view of a friction device similar to that shown in FIG. 1, except that the device is here depicted in frictional engagement with a member to be engaged;

FIG. 3 is an enlarged fragmentary exploded view in perspective of an end portion of the device shown in FIGS. 1 and 2;

FIG. 4 shows in (a) (b) (c) and (d), cross-sections of a wire stock during the several stages of forming a flat wire helix in accordance with prior practices, and depicts in (d), undesirable angular separation of adjacent turns of the helix; and FIG. 5 made up of FIGS. 5(a), 5(b) and 5(c), depicts steps in making flat wire coil according to the invention. FIG. 5(a) illustrates a flat wire beveled to provide a compensation for coil winding stresses so that adjacent coil turns are in full edge surface engagement as shown fragmentarily in FIG. 5(b), and the completed coil, after exposed surface machining, is illustrated in the partly sectioned fragment thereof shown in FIG. 5(c).

An embodiment of a friction device chosen to illustrate the invention, is shown in FIGS. 1 and 2. The friction device includes a core in the form of a shaft or torque rod 10 which is integral with a manually engageable handle 12. The lower free end portion of the torque rod, as viewed in FIG. 1, is hollow to provide a space 14 receiving a sleeve 16. The torque rod 10 also includes an inner screw-threaded portion 18 into which a screw 20 is threaded. The screw 20 is provided with a head 22 which engages the sleeve 16 and locks the sleeve in fixed relation with respect to the torque rod 10.

The sleeve 16, as shown more clearly in FIG. 3, includes a sleeve portion 24 and a flange portion 26. The flange 26 has a spiral surface 28 terminating in an exposed face or edge 30 having a function to be described in the following.

Telescoped over the torque rod 10, is a second sleeve 32 having a frustoconical portion 34, between a relatively small outside diameter portion 36 and a relatively large outside diameter portion 38. The latter is knurled at its periphery to facilitate manual engagement thereof for a purpose to be described. A set screw 40 is threaded through sleeve portion 38 and is adapted to bear on the torque rod for locking the torque rod 10 and sleeve 32 in any desired angular position. Sleeve portion 36 is provided with a spiral surface 42 which terminates in an exposed face or edge 44 having a stop function to be described.

Also telescoped over the torque rod 10 is a sleeve structure comprising a helically wound flat spring 46. The helical structure or spring 46, as well as the sleeves 32 and 16, are preferably made of hardened steel. The upper end of the spring 46 as viewed in FIGS. 1 and 2 is adapted to bear against edge 44, and the lower end of the spring is adapted to bear against edge 30 shown in FIG. 3. The spring 46 is suitably processed so that in the absence of torque thereon, it assumes the contracted form shown in FIG. 1. Application of torque to the spring 46 by relative angular movement in opposite directions of stop edges 44 and 30, against the adjacent spring ends, causes the spring to expand radially, as shown in FIG. 2. In its contracted form, the outside diameter of the helical spring 46 is closely matched to the outside diameters of the flange 26 (FIG. 3) and sleeve portions 36 (FIG. 1). Consequently, in this form, the device may be inserted into a member or work piece 48 which may be a blank for a grid for an electron tube, having an outside surface area 50 to be machined.

For service as a friction device for holding the work piece 48 during a machining of the surface portion 50 thereof, it is essential that the magnitude of radial expansion or distention to which the helix 46 responds when torque is applied to the ends thereof be sufficient to cause the outer surface of the spring to frictionally engage the inner surface of coupling member or work piece 48 with appreciable force, as shown in FIG. 2. The application of torque to the ends of the helix may be effected manually or mechanically. Manual application is effected by engaging the knurled sleeve portion 38, and the handle portion 12 of the torque rod, and while restraining rotation of the sleeve 32, rotating the handle 12 and torque rod 10 in a clockwise direction (when viewed from above) as shown by the arrow 52 in FIG. 2. Such rotation will cause the edge or stop 30 of the sleeve 16 to transmit torque to the helix 46 in a direction to cause the lower end 54 of the helix to rotate in a clockwise direction while the upper end 56 (FIG. 2) of the helix is restrained against motion by stop 44. In response to this combination of forces acting upon it, the helix 46 will expand radially into a firm frictional engagement with the work piece 48. The lock screw 40 may then be tightened against the torque rod, to hold the torque rod against further relative angular movement with respect to sleeve 32.

The application of torque mechanically may be effected by fixing the handle 12 of the torque rod 10 in a suitable chuck or other holding device, not shown. In this situation, the knurled sleeve portion 38 is adapted to be rotated either manually or by automatic means, not shown, to produce the combination of torque forces referred to, to cause the friction device to engage a work piece.

It will be noted that the helix 46 serves as a radially expandable mandrel in the environment illustrated in FIG. 1. The helix is required to exert sufficient force on the inner surface of the relatively fragile work piece shown, to keep it from movement while the outer surface of the work piece is being machined. The magnitude of this force must continue throughout the entire machining operation, during which the material of the work piece in the area 50 is made progressively thinner. Any irregularity in the outer surface of the helix structure 46 would be reflected in surface deformation of the work piece as it is thinned down.

To provide a helical structure having a smooth and continuous cylindrical outer surface involves a serious problem. One way known heretofore of making a helix from flat wire, is illustrated in FIG. 4. In accordance with such practice, a wire 58 (FIG. 4a) of circular cross-section is first flattened to the substantially rectangular cross-section shown in FIG. 4b. The rounded edges were then cut off to provide square edges shown in FIG. 4c. The resultant wire is then wound to provide a helix 60 (FIG. 4d). During the winding operation the outer surface 62 of the wire is subjected to tension stresses tending to pull the material of the coil away from the edges 64, 66. The inner surface 68, however, is subjected to compressive stresses tending to spread the material of the helix wire laterally. As a consequence, the cross-section of a wire after winding resembled the frustum of a cone (FIG. 4d). No amount of machining could corerct the recessed condition in the outer surface represented by the helical groove 70. Such groove would be intolerable in applications involving use of the device for supporting a fragile work piece during a machining operation. The passes of the machining tool, being in many cases in paths narrower than the width of groove 70, would result in penetration of the work piece material at the region of the groove, or in serious surface deformation thereof, as the material progressed in thinness. A mandrel, having a helix structure made in this fashion, was not at all suited for supporting a fragile work piece during a machining operation.

According to one aspect of my invention, this problem is solved by a novel method of making the helical structure 46. This method, depicted in FIG. 5, involves beveling the edges of a flattened wire shown in FIG. 4b to provide the shape shown in FIG. 5a. The beveled edges 72, 75 describe an angle 74 with respect to a line 76 normal to the flat parallel surfaces 78, 80, that equals one half the angle described by adjacent edges 64, 65 (FIG. 4d). In one example, the angle between edges 64, 65 was found to involve a maximum separation between the edges of 0.003 inch. The maximum separation of the beveled edges 72, 75 with respect to line 76 was therefore 0.0015 inch. The beveled wire 82 is then wound to helix form with the wider surface 78 constituting the outer surface of the helix. The translations of material affected by the winding of the beveled wire to helix form are found by applicant to be of a magnitude to bring adjacent turns of the resultant helix into full surface engagement, as shown in FIG. 5b.

It is found that translations in the wire material during winding to helical coil shape result in protuberances 84 in the outer surface of the helix. These protuberances, however, are readily accessible to a machining tool for complete removal. After such removal, the outer surface 86 of the helix is continuous and smooth, as shown in FIG. 5c.

In one example, the outer diameter the helix 46 in released state, was 0.2048 inch, and when the helix was expanded in response to torque, this dimension was 0.2050 inch. The thickness of the helix wire was 0.025 inch and its width was 0.060 inch. The helix had a total of ten turns. The helix mandrel was therefore adapted to frictionally engage the inner wall of portion 50 of the work piece 48, whose inner diameter was slightly less than 0.2050 inch but greater than 0.2048 inch.

It will be noted from the foregoing that the device of my invention is characterized by a substantial mechanical advantage. Thus, the torque applied by the relatively small area stop surfaces 30 and 44, is transmitted to the spring 46 and dissipated throughout its length. It should be noted that the movement affected by the stop surfaces 30 and 44 is equal to the total of movements transmitted to the several turns of the helical spring 46, and is much larger than the radial expansion. Consequently, an appreciable mechanical advantage is realized by my device so that a relatively small torque force applied to the stop surfaces 30, 44, results in a much larger radial force on the spring 46. This permits the torque rod to be of very small diameter without danger of rupture. Such very small diameter to which the torque rod may be made, in turn presents freedom in respect of miniaturization of the friction device as a whole, thereby adapting the device to applications involving the support of extremely small work pieces, for which no suitable holding devices have been available heretofore.

It is apparent from the foregoing that an improved friction device is provided having advantages in supporting a work piece and in effecting a friction coupling to another member.

I claim:

1. A mandrel for holding a relatively fragile cylindrical metal workpiece during a machining of the outer surface of the workpiece, said mandrel comprising
   (a) an elongated core,
   (b) a helical spring telescoped over said core, the turns of said spring having opposite engaging edges each having a planar surface extending through a thickness dimension of the material of said spring, the turns of said spring being of uniform width throughout the length of the spring, and
   (c) means for radially distending said spring while preserving said opposite edges in contact relation, for uniformally engaging the inner surface of said workpiece, said means comprising
      (1) two sleeves mounted in axially-spaced relation on said core, adjacent ends of the sleeves having helical surfaces conforming to the helical end surfaces of the spring structure, said end surfaces engaging said helical surfaces, and stops for engaging the free ends of the terminal turns of said spring,
      (2) means restraining axial separation of said sleeves, and
      (3) means for axially rotating one of said sleeves with respect to the other.

2. A friction device comprising a shaft, a helical spring defining a substantially continuous cylindrical surface telescoped over one axial portion of said shaft, a sleeve telescoped over another axial portion of said shaft, a first stop on the end portion of said shaft remote from said sleeve and engaging one end portion of said spring for restraining axial rotation thereof on said shaft in one direction, a helical surface on said end portion terminating in said stop and adapted to engage said end portion of said spring, and a second stop on the end portion of said sleeve adjacent to said spring and engaging the other end portion of said spring for restraining rotation of said spring in the opposite direction, said other end portion of the sleeve having a helical surface extending to said second stop, said sleeve being rotatable on said shaft, whereby rotation of said sleeve in said one direction with respect to said shaft causes said second stop to urge said spring into rotation against said first stop for expanding said spring radially.

3. A friction device comprising a helical spring having a substantially continuous outer cylindrical surface and a uniform cross-section from one end thereof to the other, said spring being releasable to a contracted condition for receiving a tubular work piece in telescoped relation thereover, means including a first helical surface coaxial with said spring and a first stop surface parallel to the axis of said spring engaging one end portion of said spring for applying torque to said spring in one angular direction about the axis of said spring, and means including a second helical surface coaxial with said spring and a second stop parallel to the axis of the spring engaging the other end portion of said spring for applying torque thereto in the opposite angular direction, said spring having helical end surfaces snugly engaging said first and second helical surfaces, the final turns of said spring terminating in surfaces axially parallel to the axis of the spring and abutting against said first and second stops, whereby said spring is expanded radially for frictionally supporting said work piece.

4. A friction device comprising a helical spring having convolutions in a cylindrical plane, a torque rod having one end in torque transfer relation in one angular direction and in helical surface engagement with respect to one end portion of said spring, and a torque sleeve rotatable with respect to said torque rod on a common axis therewith and engaging the other end of said spring in a helical surface engagement and in torque transfer relation in the opposite angular direction, said torque rod and sleeve having manually engageable portions at adjacent end regions thereof, whereby said torque rod and said sleeve may be rotated in said torque transfer directions for radially expanding said spring uniformly along its length into a frictional engagement with the inner surface of a tubular member.

5. A friction device comprising a cylindrical member having a predetermined inner diameter and a structure connected to said member for preserving torque synchronism between said member and structure, said structure comprising a helical spring, and means for selectively contracting said spring radially to a predetermined diameter for facilitating entrance of said spring into said member, and for expanding said spring radially into a relatively tight frictional engagement with the inner wall of said member, said means including opposed stop members engaging spaced lateral end portions of said spring, said members being oppositely rotatable about the axis of said spring for selectively releasing torque therein and supplying torque thereto, said spring in the absence of torque having an outer predetermined diameter smaller than said inner diameter, the ends of said helical spring defining helical surfaces, said members having helically shaped surfaces snugly engaging said helical surfaces for uniformly expanding said spring.

References Cited in the file of this patent

UNITED STATES PATENTS

| | | |
|---|---|---|
| 2,359,900 | Endsley | Oct. 10, 1944 |
| 2,668,347 | Gorske | Feb. 9, 1954 |
| 2,818,264 | Overstreet | Dec. 31, 1957 |
| 2,893,742 | Frohner | July 7, 1959 |
| 2,991,954 | Lacey | July 11, 1961 |